(12) United States Patent
Calderon et al.

(10) Patent No.: US 9,301,452 B2
(45) Date of Patent: Apr. 5, 2016

(54) SUSTAINABLE METHOD INCLUSIVE OF FACILITIES TO GROW AND PROCESS CROPS FOR FOOD AND BIOMASS FOR ENERGY IN AN ENVIRONMENTALLY ACCEPTABLE MANNER

(75) Inventors: Albert Calderon, Bowling Green, OH (US); Richard Owen McCarthy, Strongsville, OH (US); Terry James Laubis, Portage, OH (US)

(73) Assignee: ENERGY INDEPENDENCE OF AMERICA CORP., Bowling Green, OH (US)

( * ) Notice: Subject to any disclaimer, the term of this patent is extended or adjusted under 35 U.S.C. 154(b) by 274 days.

(21) Appl. No.: 13/573,297

(22) Filed: Sep. 10, 2012

(65) Prior Publication Data

US 2014/0069003 A1 Mar. 13, 2014

(51) Int. Cl.
*A01G 1/00* (2006.01)
*A01B 79/02* (2006.01)

(52) U.S. Cl.
CPC ............... *A01G 1/001* (2013.01); *A01B 79/02* (2013.01); *Y02E 50/12* (2013.01)

(58) Field of Classification Search
CPC ......... A01G 1/001; A01B 79/02; Y02E 50/12
USPC ...... 47/48.5, 58.1 R, 1.01 R, 1.4, 17; 405/36, 405/40, 41, 42, 43, 44, 51, 52, 53
See application file for complete search history.

(56) References Cited

U.S. PATENT DOCUMENTS

| | | | | |
|---|---|---|---|---|
| 4,373,994 A * | 2/1983 | Lee | ................................. | 201/22 |
| 5,820,759 A * | 10/1998 | Stewart et al. | ................ | 210/602 |
| 6,068,773 A * | 5/2000 | Sheaffer | ................... | C02F 3/301 |
| | | | | 210/149 |
| 6,955,765 B2 * | 10/2005 | Rosen et al. | ................... | 210/739 |
| 7,258,790 B2 * | 8/2007 | Brune et al. | .................. | 210/602 |
| 7,491,861 B2 * | 2/2009 | Mason | ................... | B01D 53/75 |
| | | | | 588/320 |
| 7,938,964 B2 * | 5/2011 | de Strulle | ....................... | 210/602 |
| 8,122,637 B2 * | 2/2012 | Blotsky | ............................ | 47/1.4 |
| 8,126,780 B2 * | 2/2012 | Iwai et al. | ..................... | 705/26.1 |
| 2004/0111968 A1 * | 6/2004 | Day et al. | ................. | 48/197 FM |
| 2007/0119369 A1 * | 5/2007 | Lee et al. | ....................... | 118/715 |
| 2008/0173581 A1 * | 7/2008 | Maclean | ................... | C02F 3/06 |
| | | | | 210/620 |
| 2011/0061295 A1 * | 3/2011 | McAlister | ...................... | 47/59 R |
| 2012/0047975 A1 * | 3/2012 | Calderon et al. | ................... | 71/24 |
| 2013/0056685 A1 * | 3/2013 | Badhe et al. | ................... | 252/373 |

* cited by examiner

*Primary Examiner* — Ebony Evans (57) ABSTRACT

An advanced method and facility for growing abundant crops for food together with a sustainable growth of biomass for energy within a farm setting measuring (by way of example) 600 acres and yielding some 180 bushels of corn per acre, amounting to a total farm yield of 108,000 bushels. By increasing the yield of 180 to 270 bushels per acre with drainage, irrigation, and a pond that accepts water in wet weather and dispenses water for irrigation in dry weather, and supplementing with fertilizer, the 108,000 bushels can be produced with only 400 acres, this freeing 200 acres for growing biomass to be harvested and delivered to a centralized processor (preferably in pellet form) and efficiently converts the biomass into a biofuel rich in $H_2$ for transportation such as gasoline and a low-Btu biofuel to generate biopower while co-producing fertilizer to enhance growth of both crops and biomass.

21 Claims, 8 Drawing Sheets

FIG. 3 BIOMASS PROCESSOR

SUSTAINABLE METHOD INCLUSIVE OF FACILITIES TO GROW AND PROCESS CROPS FOR FOOD AND BIOMASS FOR ENERGY IN AN ENVIRONMENTALLY ACCEPTABLE MANNER

The present invention is a further development made to a patent issued on Aug. 16, 2011 to the Applicant bearing U.S. Pat. No. 7,998,236 B2 whose title is "Advanced Method for Processing Fuels," in which the fuels include coke, bituminous or sub-bituminous coal, petroleum coke, lignite, biomass, etc. (Col. 2, lines 63 and 64). The instant invention is specific in providing a method and facilities to maintain the sustainability of crops growth for food as well as the sustainability of biomass growth for energy and the processing thereof in order to guarantee the continuous production of economical products from crops and biomass irrespective of droughts that cause financial losses to farmers and cost increases to consumers.

Therefore, the invention herein disclosed comprises a method to abundantly co-produce agricultural crops together with a biomass resource and to process them into economic products such as food and clean transport bio-fuels, such as gasoline and/or dimethyl ether (a replacement for dirty diesel), bio-power, and by-product fertilizer from flue gases containing $N_2+CO_2$ emitted from the generation of electricity. This method will address the urgent need for low-cost food resource and a low-cost biomass resource to effect sustainable resources, while creating an enormous number of badly needed permanent jobs and avoiding the common practice of abandoning manufacturing facilities in towns that cause large-scale unemployment which creates local economic problems and social instability.

The U.S. Department of Energy (DOE) in partnership with the U.S. Department of Agriculture (USDA), in May of 2010, issued a solicitation (Funding Opportunity Number: DE-FOA-0000341) for a Biomass Research and Development Initiative stating the following:

"Both DOE and USDA have been given responsibility to support the development of a biomass-based industry in the United States. The objectives of this responsibility are specified the section 9008(e) of FSRIA [Farm Security and Rural Investment Act (of 2002)], as amended, which requires the development of:
  (A) technologies and processes necessary for abundant commercial production of biofuels at prices competitive with fossil fuels;
  (B) high-value biobased products—
    (i) to enhance the economic viability of biofuels and biopower;
    (ii) to serve as substitutes for petroleum-based feedstocks and products; and
    (iii) to enhance the value of coproducts produced using the technologies and processes; and
  (C) a diversity of economically and environmentally sustainable domestic sources of renewable biomass for conversion to biofuels, bioenergy, and biobased products."

The U.S. Department of Energy granted an award to develop a process to produce gasoline from biomass to the National Renewable Energy Laboratory (NREL), situated in Golden, Colo., under a contract No DE-AC36-08G028308, hereinafter referred to as the "NREL" process, but the solution produced by NREL is very complex, deficient and impractical, as will be demonstrated hereunder with reference Fact Sheets 1, 2, and 3, which are part of this application.

BACKGROUND

The NREL process, illustrated in Fact Sheet 1, consists of a plurality of fluid beds wherein the first fluid bed is a gasifier through which hot olivine (sand) is recycled that indirectly heats the biomass to cause it to release its volatile matter in the form of a tar-containing raw syngas. The fluidization of the biomass in the gasifier is effected by means of steam, with the sand being heated in a first combustion chamber which is separate from the gasifier, using char as a fuel. Downstream of the gasifier, a second fluid bed is provided as a tar reformer through which a hot, regenerated, nickel-based catalyst is circulated which heats the tar-containing raw syngas in order to crack its tar into lighter hydrocarbons. The fluidization medium in the second fluid bed, in which the raw syngas is converted to a tar-free syngas, is also steam, with its catalyst being recycled and heated in a second combustion chamber that is separate from the tar reformer, using a diverted side stream of raw syngas, which is characterized as a "diverted syngas," from the main stream of the raw syngas that is being fed from the gasifier to the tar reformer. This side stream serves as the fuel in the second combustion chamber, within which the tar containing raw syngas is converted to a "tar-free syngas." At this stage, the tar-free syngas is cooled and scrubbed into a "dry syngas" in a separate chamber that serves as a "Quench and Scrubber."

Since the process of NREL described herein operates at low pressure (23 psi), and to produce methanol requires a pressure of about 750 psi, the dry syngas is compressed and directed to a water-gas shift in order to increase the ratio of $H_2$ to CO, and in so doing, $CO_2$ is formed. Up to this point, no sulfur provision is made to remove the sulfur in the form of $H_2S$ from the syngas stream; this results in a mixture of gases whose composition includes syngas, $CO_2$, and $H_2S$ that is fed to a separator from which three separate gases are produced—namely, $CO_2$, which is discharged to the atmosphere; $H_2S$ directed to a sulfur plant where it is treated at low temperature with amine; and a clean syngas directed to a methanol plant to produce methanol that is converted to gasoline by the known MTG process that belongs to ExxonMobil.

It is to be noted that the instant invention of the Applicant does use the same technology relating to the making of methanol which is converted to gasoline (MTG) of ExxonMobil as NREL, but the complexities and disadvantages of the NREL process that produces the syngas to make the methanol are evident, especially when compared to the Applicant's invention, as listed in Fact Sheets 2 and 3, which deals with the conversion of the biomass into the clean syngas that serves as the feedstock (resource) to produce the methanol that would be converted to gasoline or to any other biofuel or chemical.

In particular, the main outstanding disadvantage of the NREL process is the massive solids recycling that takes place in the circulation of the olivine (sand) to indirectly heat the biomass in the gasifier that requires for every one (1) pound of biomass, twenty-seven (27) pounds of hot olivine need to be circulated (reported by NREL on page 18, paragraph 5, of its Final Report, which was made public in January 2011. Since the capacity of the facility was designed to feed 2,205 tons per day of biomass, it means that 59,535 tons per day of olivine would have to be circulated from the char combustion chamber to the gasifier and from the gasifier back to the char combustion chamber. This amount of solid movement is impractical, especially for the puny daily production of only 2,857 barrels of oil equivalent.

Other NREL disadvantages are as follows:

An unrealistic capacity factor of 96% in view of the potential abrasive properties of hot sand circulating to and from gasification equipment through pipes will require frequent maintenance and quite possibly frequent replacement which will cause complete shut downs of the NREL process;

Low process pressure in gasification, tar reforming, and quenching, gas scrubbing; and catalyst indirect heating;

Indirect heating of biomass by the olivine;

Excessive use of water and its treatment;

Water-gas shift, producing $CO_2$;

Char combustion, producing flue gas containing $CO_2$;

No provision for $CO_2$ conversion to useful product;

Inefficiency in syngas compression;

Heat losses from massive solids recycling;

Cold syngas cleanup;

Wet quenching and scrubbing;

Amine sulfur removal;

Ash production, which is expensive to dispose;

The use of expensive catalyst;

High capital cost; and

No provision for guaranteeing availability of biomass resource to provide sustainability.

OBJECTIVES OF THE PRESENT INVENTION

The main object of the present invention is to address the issue of droughts which affect food prices to consumers and losses to farmers.

Another object of the instant invention is to provide sustainability with respect to the availability of the biomass resource.

Still another object of the present invention is to prevent the pollution from farms' run-off into waterways such as streams, creeks, rivers, and lakes.

Yet another object of the instant invention is the prevention of discharging miscellaneous wastes into said waterways.

Further another object of the present invention is to increase farmers' income to make up for the retirement of current subsidies.

Therefore another object of the instant invention is to provide efficient means to process biomass in an environmentally acceptable manner.

Further still another object of the instant invention is to provide a surtax, in addition to normal income taxes, to create an extra revenue to local and federal governments to address serious short-falls in their budgets.

Further yet another object of the present invention is to provide efficient means to process biomass economically.

Also another object of the instant invention is to provide an increase in revenue to farmers to incentivize them to cooperate in working towards the realization of growing crops as well as biomass.

It is another object of the present invention to increase the yield of crops in order to enable the growth of biomass in the same acreage of farmland without degrading the normal yields of the crops from said acreage.

It is still another object of the instant invention to efficiently convert the biomass into clean biofuels such as transport fuels.

It is yet another object of the present invention to coproduce clean electric power and transport fuels while producing fertilizer as a by-product.

It is further another object of the present invention to prevent the denuding of forest land by excessively harvesting it.

It is also another object of the present invention to create a great number of well-paying jobs, which are badly needed.

It is therefore another object of the present invention to offer superior technologies than that proposed by NREL.

The above and other objects of the instant invention will become more apparent to those skilled in the art to which this invention pertains from the description which is hereinafter disclosed.

Reference is now made to the accompanying Drawings and Fact Sheets forming a part of this specification wherein like reference characters designate corresponding parts in various views. It is to be understood that the embodiments shown herein and the phraseology used herein are for the purpose of description and not limitation. Other embodiments and phraseology may be used without departing from the spirit of the invention.

BRIEF DESCRIPTION OF DRAWINGS

It is to be noted that in the case of FIGS. 1, 2, and 8 the description entails the use of letters and words for description, and the structure comprises the use of numerals to characterize the components in FIGS. 3, 4, 5, 6, and 7.

DETAILED DESCRIPTION OF THE DRAWINGS

Figure 1:
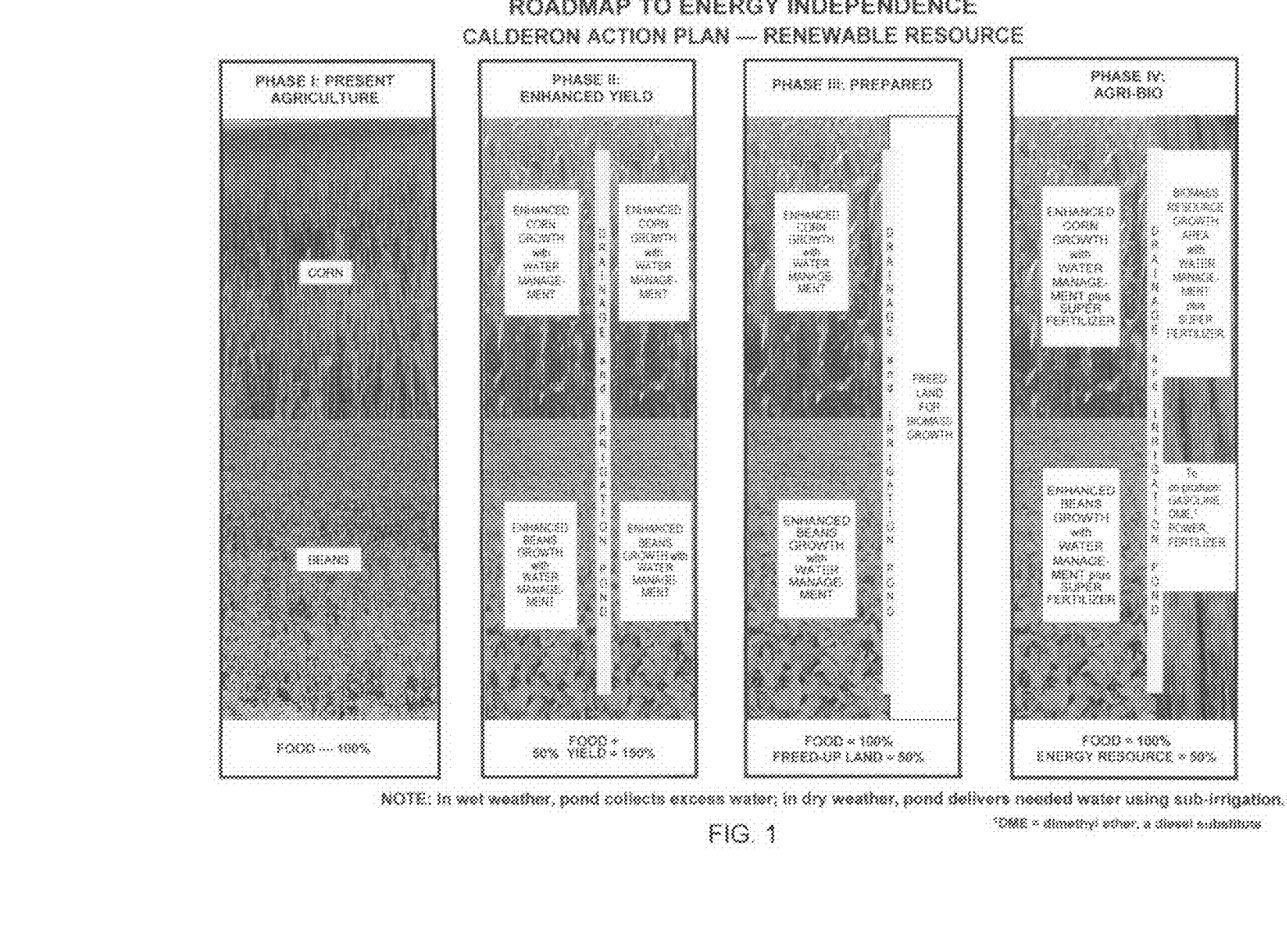
FIG. 1 shows actual field photographs to describe the phases to go through to enable the production of abundant biomass without affecting the growth of normal crops such as corn and soybeans and still be able to produce abundant biomass for conversion to energy in a sustainable manner.

Reference is made to FIG. 1, which illustrates the phases to undergo in order to produce abundant crops for food and abundant biomass for conversion to energy while still being compatible with the environment. By way of example, using corn and soybeans (hereinafter referred to as "beans"), Phase I, as illustrated photographically is commonly practiced. Phase II incorporates enhanced growth of corn and beans to increase yield by adding a drainage and irrigation pond in the same field shown in Phase I, with the farming practice which comprises that during the rainy season excess water is drained into the pond, and in dry weather a sub-irrigation system waters the crops with the water originating from the pond. It is not uncommon that often it is too wet in the spring and too dry in the summer which places farmers' revenue at the mercy of the weather. A practice that enables farmers who grow crops to control wet and dry conditions will greatly improve their yield and add certainty to agro-business. In addition, by adding char to the fertilizer, the yield can be further increased, especially that the fertilizer is Oxamide, a slow-release fertilizer that makes it possible to increase the yield even more. Reference is made to Fact Sheet 5 which relates to OXAMIDE, with attention being paid to the part headed by "Production and Application," $2^{nd}$ paragraph, that states the following: "The main application is as substitute urea in fertilizers. Oxamide hydrolyzes (releases ammonia) very slowly, which is sometimes preferred vs. the quick release of urea."

This approach makes possible the production of both the corn and beans in an amount equal or greater to that produced in Phase I, with less land, thus making available land as shown in Phase III, FIG. 1, to result in freeing land to plant biomass without affecting the yield of corn and beans. Phase IV is to plant in the freed land a suitable biomass plant, such as miscanthus, for conversion to energy, thus obtaining from the same size of farmland adequate crop(s) for food and adequate, sustainable biomass for energy.

Figure 2:
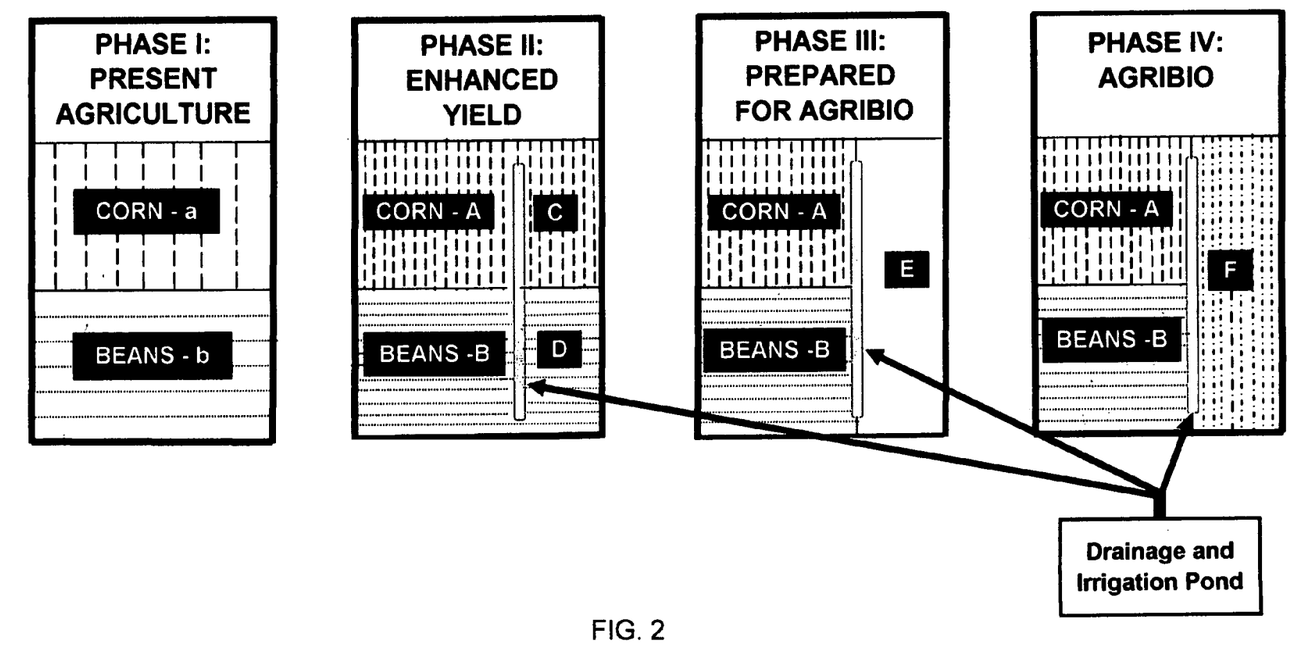
FIG. 2 is an illustration in support of FIG. 1 showing the progressive phases to go through to enable the growth of the biomass without depending on deforestation and, in essence, increasing the current yield of crops destined to be consumed as food while also making available an ample and sustainable source of biomass as a renewable resource for the production of low-cost biofuels and biopower.

Referring to FIG. 2, which is an amplification of FIG. 1, illustrates by making use of letters to identify crop growth by sections wherein letter "a" represents corn and letter "b" represents beans as Phase I without drainage into a pond and irrigation from the same (Phase I). Phase II is illustrated by means of letters "A," "B," "C," and "D." Phase III is illustrated by means of letters "A," "B," and "E." Phase IV is illustrated by means of letters "A," "B," and "F."

Figure 3:
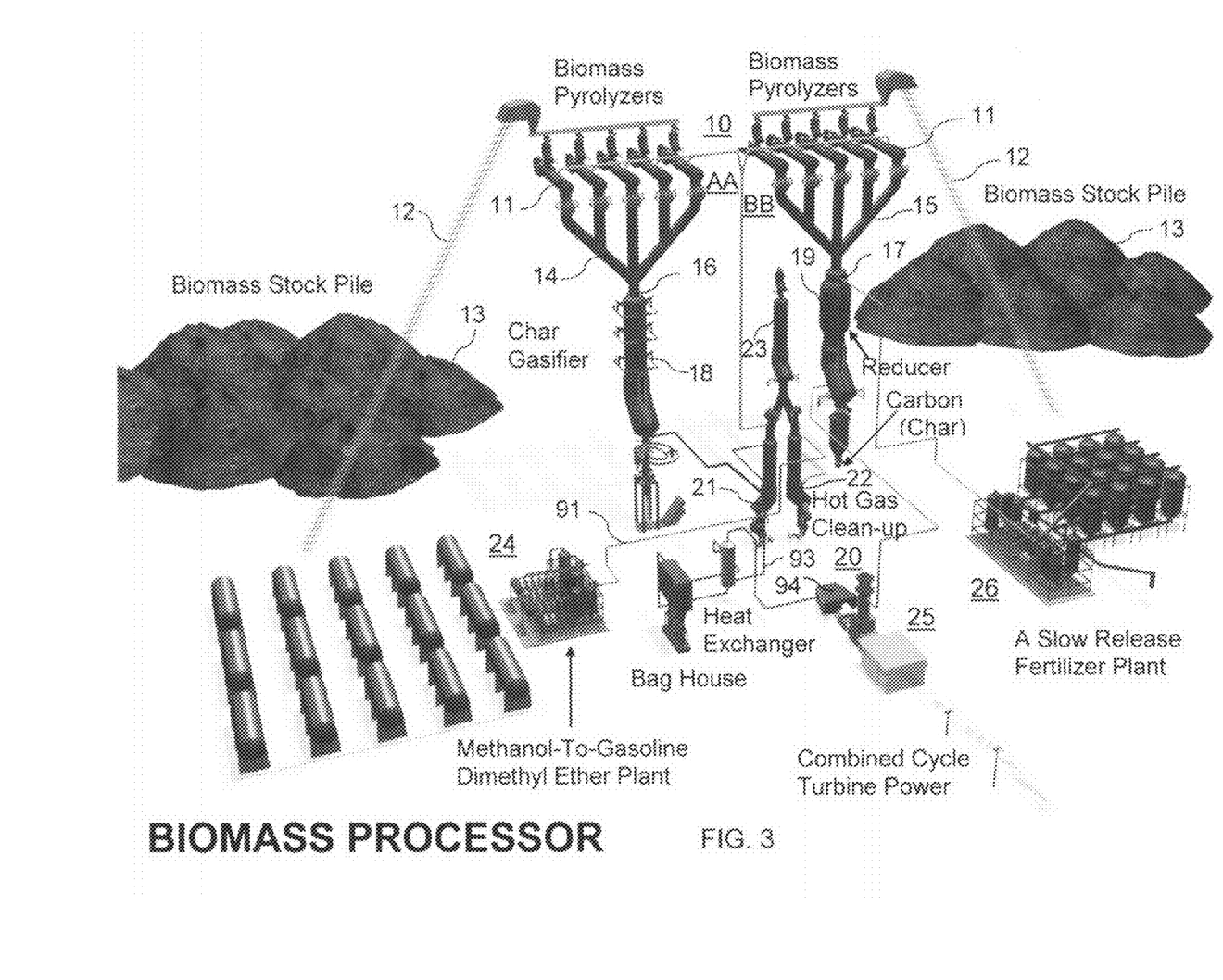
FIG. 3 illustrates a Processor for Biomass in perspective, comprising the co-production of liquid transport fuel, such as gasoline and/or dimethyl ether, and electric power, with the flue gas containing $N_2+CO_2$ resulting from the generation of the power being directed to a reducer for the conversion of $CO_2$ into CO which is thence fed to the plant which produces the fertilizer.

Reference is now made to FIG. 3 which illustrates the Processor, with numeral 10 representing a battery composed of a plurality of pyrolyzers, one of which being marked by numeral 11, and skip hoists 12 adapted to transport the biomass from storage 13, situated at ground level, to the top of battery 10, which consists, by way of example, of two groups of five pyrolyzers each, with each group marked by either letters AA or letters BB. A manifold system marked by numeral 14 assembles the discharge ends of the pyrolyzers in group AA, and a similar manifold marked by numeral 15 assembles the discharge ends of the pyrolyzers in group BB, with manifold 14 connecting to the top of a char gasifier marked by numeral 16 and manifold 15 connecting to the top of a reducer marked by numeral 17. Char gasifier 16 is equipped with several injection ports, such as port 18, for the injection of a gas containing oxygen, such as air, pure oxygen, or air enriched with oxygen, to produce a fuel gas, and reducer 17 is equipped with a heater marked by numeral 19, which can take the form of any means adapted to supply thermal energy.

A hot gas cleanup marked by numeral 20 is made up of three vessels: a vessel to clean volatile matter from pyrolyzers 11, marked by numeral 22; a vessel to clean fuel gas from char gasifier 16, marked by numeral 21; and a regenerator to regenerate the sorbent, marked by numeral 23. The volatile matter after cleanup is a $H_2$ rich gas that is fed to a methanol/gasoline plant marked by numeral 24; the fuel gas after cleanup is a lean gas that is fed to an electric power generating plant marked by numeral 25, these two gases being shown in Fact Sheet 4. The exhaust from the combustion of the lean gas in plant 25, consisting of mainly of $CO_2$ and $N_2$, is directed to reducer 17 for the $CO_2$ conversion to $2CO_3$ and thence directed to a fertilizer plant marked by numeral 26.

Figure 4:
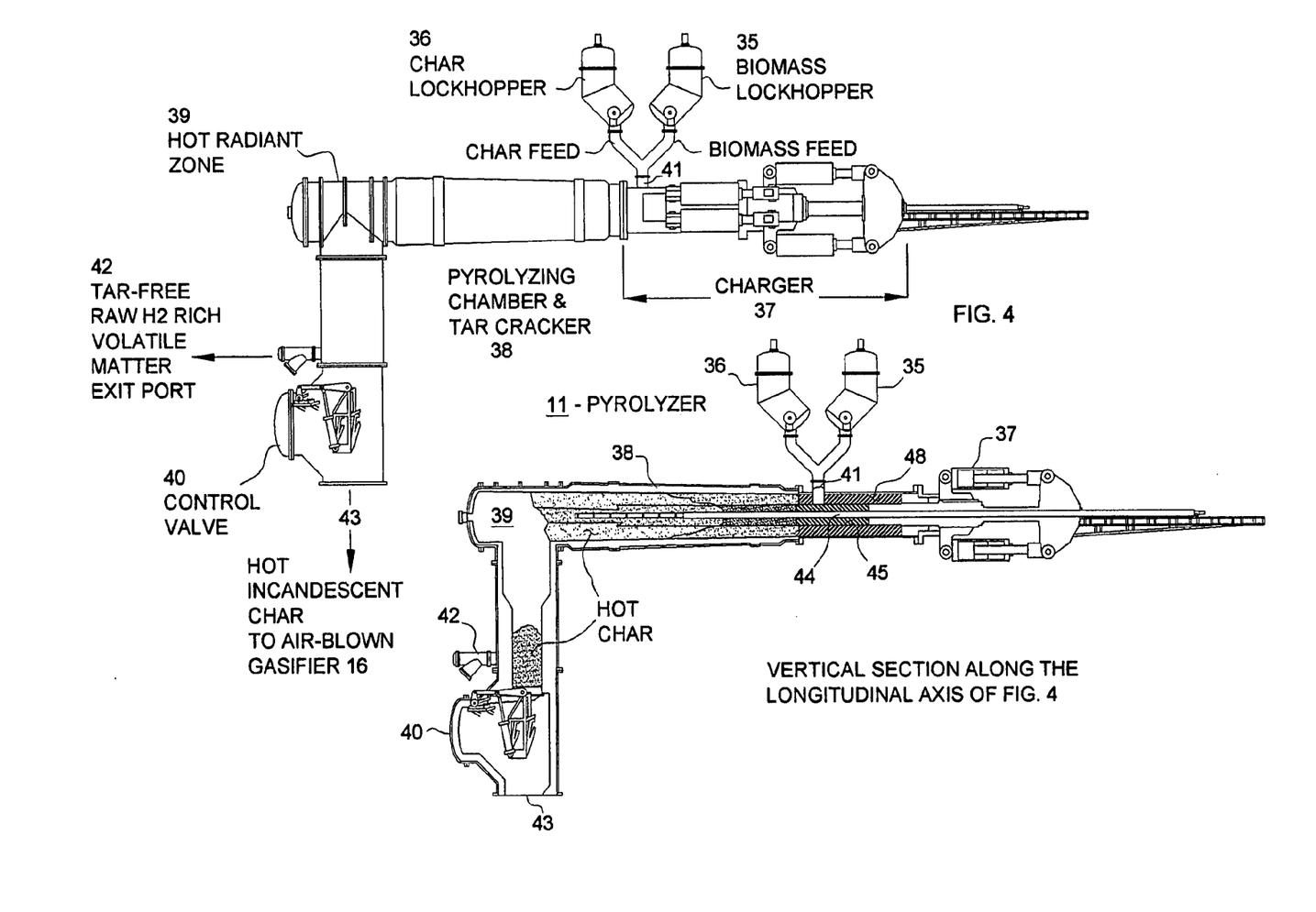
FIG. 4 shows the pyrolyzer, per se, in perspective, to process the biomass to produce a $H_2$ rich gas and biochar. For clarity, an accompanying representation is included to show the pyrolyzer as a vertical section along the longitudinal axis of FIG. 4.

FIG. 4 illustrates in perspective, pyrolyzer 11, which is also represented by a vertical section along its longitudinal axis, and is made up of lockhopper feeders 35 and 36, charger 37, pyrolyzing chamber and tar cracker denoted by numeral 38, radiant zone 39, and control valve 40. The biomass and, in some cases, the char are respectively fed from lockhoppers 35 and 36 by way of a "Y" piping configuration denoted by numeral 41. The exit port for the $H_2$ rich volatile matter is marked by numeral 42 and the hot incandescent char being discharged into gasifier 16 (not shown in FIG. 4) by way of port 43.

For additional clarification, it is to be noted that in providing lance 44 wherein the char charged as a core surrounded by an annulus of biomass using mandrel 45, is combusted under suppressed conditions, in a pressurized, controlled reducing atmosphere, the heat transfer within chamber 38 is markedly improved, thus enhancing the rate at which the biomass devotalizes its volatile matter, while vigorously cracking unwanted tars.

Figure 5:
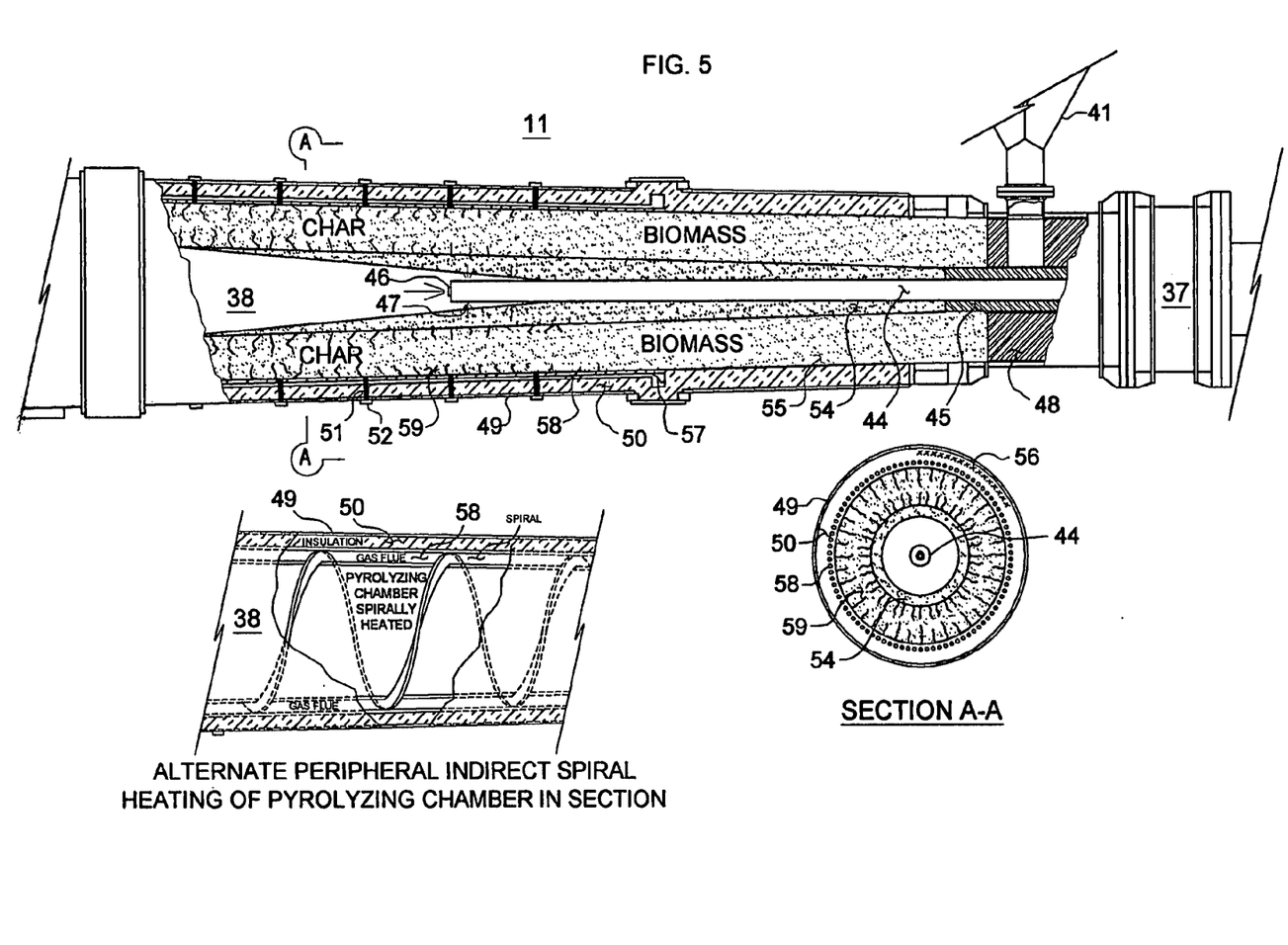
FIG. 5 is a partial longitudinal section showing the internals of a pyrolyzer whose function is to devolatilize biomass while co-producing char, accompanied by a cross-sectional view taken at A-A of the pyrolyzing chamber shown in FIG. 5. An alternate heating design of the pyrolyzing chamber is also shown in part along with its longitudinal section in the form of a spiral hot gas flue.

Referring now to FIG. 5 for additional detail at a larger scale of pyrolyzer 11, lance 44, in addition to its capability to inject a gas containing oxygen through its tip denoted by numeral 46, is equipped with injection nozzles on its side denoted by numeral 47. Lance 44, like mandrel 45 and ram 48, is adapted to advance and retract independently; because of the high temperature surrounding lance 44, it is cooled preferably with a cooling liquid such as water circulating through it in a closed loop.

The biomass is heated peripherally by means of injection nozzles disposed through shell 49 and refractory 50, one of which being marked by numeral 51, with such nozzles being supplied with a gas containing oxygen furnished by manifold 52, thus providing direct, pressurized, bi-directional, efficient heating that increases the release of the volatile matter from the biomass annulus to such an extent that virtually all the oils in the biomass are recovered in tar-free vapor form.

In the instant invention wherein a core of char, marked by numeral 54, is surrounded by an annulus of biomass and the char is combusted by the gas containing oxygen injected by lance 44, the combustion of the biomass is reduced to a minimum, and the yield of $H_2$ rich raw gas (raw syngas) is markedly increased, this being an important and beneficial factor, as a $H_2$ rich syngas is quite valuable to be used to produce biofuels including transportation fuels such as methanol/gasoline and dimethyl ether (a clean fuel) as a substitute for dirty diesel. To achieve this objective, numeral 38 is the pyrolyzing chamber, numeral 37 is the charger, numeral 41 is the "feed piping configuration," numeral 48 is the ram, numeral 45 is the mandrel, numeral 44 is the injection lance, numeral 46 is the nozzle at the tip of lance 44, and numeral 47 is one of the several nozzles disposed at the side of lance 44, numeral 54 is the char fuel, numeral 55 is the charged biomass, and numeral 50 is the refractory/insulation which is configured as a monolithic structure that is reinforced with metallic needles such as stainless steel needles, marked by numeral 56 (shown in SECTION A-A), somewhat similar to imbedding steel wire in reinforced concrete; this structure is cast in place against shell 49.

In the case of heating the material peripherally indirectly, numeral 57 represents the manifold for distributing hot heating gas into a plurality of small-diameter flues installed in refractory/insulation 50, one such flue being marked by numeral 58 carrying hot gases that heat refractory 50, which in turn heats indirectly the biomass marked by numeral 59 shown in Section A-A. The above-described manner of peripherally indirect heating may be substituted by an alternate peripheral indirect heating design of pyrolyzing chamber 11, as illustrated partially, along its longitudinal axis (below FIG. 5), and is represented by numerals 49 for the shell, 50 for the insulation, and 58 for the spiral heating gas flue. It is to be noted that towards the exit end of pyrolyzing chamber 38, the biomass has been completely devolatilized, yielding a residue consisting of hot incandescent char essentially devoid of volatile matter.

Figure 6:
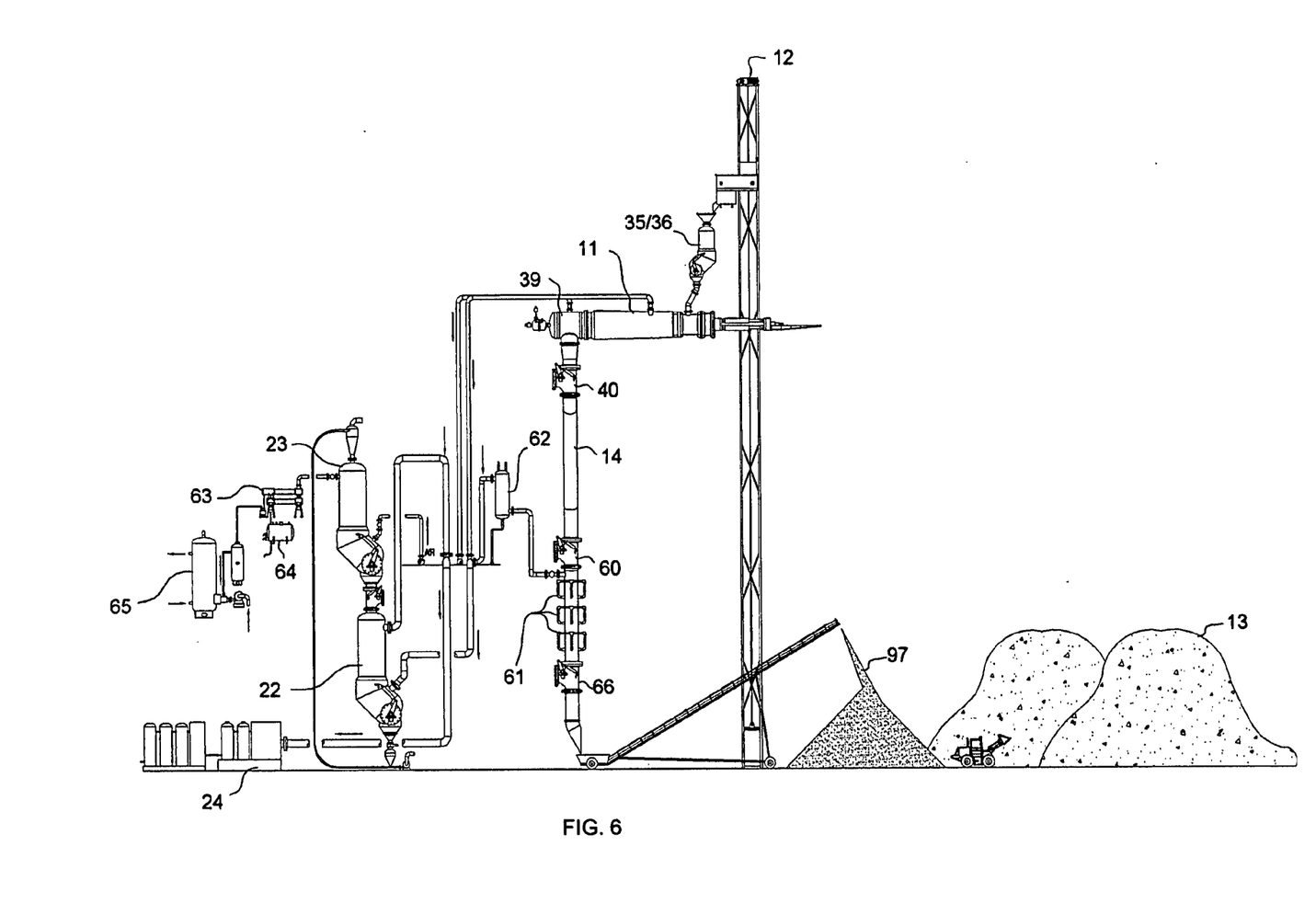
FIG. 6 illustrates the Processor in side elevation configuration inclusive of pyrolyzer and hot gas cleanup, together with a product island to produce transportation fuels, and the production of biochar that can be used for soil enhancement.

Referring to FIG. 6, which illustrates the Processor as a partial side elevation with a special feature that includes an addendum to FIG. 3, wherein a side stream is included to provide the option to divert biochar from the Processor, which can be mixed with the fertilizer, in order to impart certain properties that will improve the growth-yield of the biomass. The biochar may also be used as a fuel in pyrolyzers 11. The pile of the biochar is marked by numeral 97, with a quencher that cools the char denoted by numeral 61 and control valves denoted by numerals 60 and 66. Condenser 62 serves to collect condensate resulting from the quench. The discharge end of pyrolyzer 11 is marked by numeral 39, a sulfur condenser by numeral 63, and liquid sulfur storage by numeral 64, with non-condensable gas contained in pressurized tank marked by numeral 65.

Figure 7:
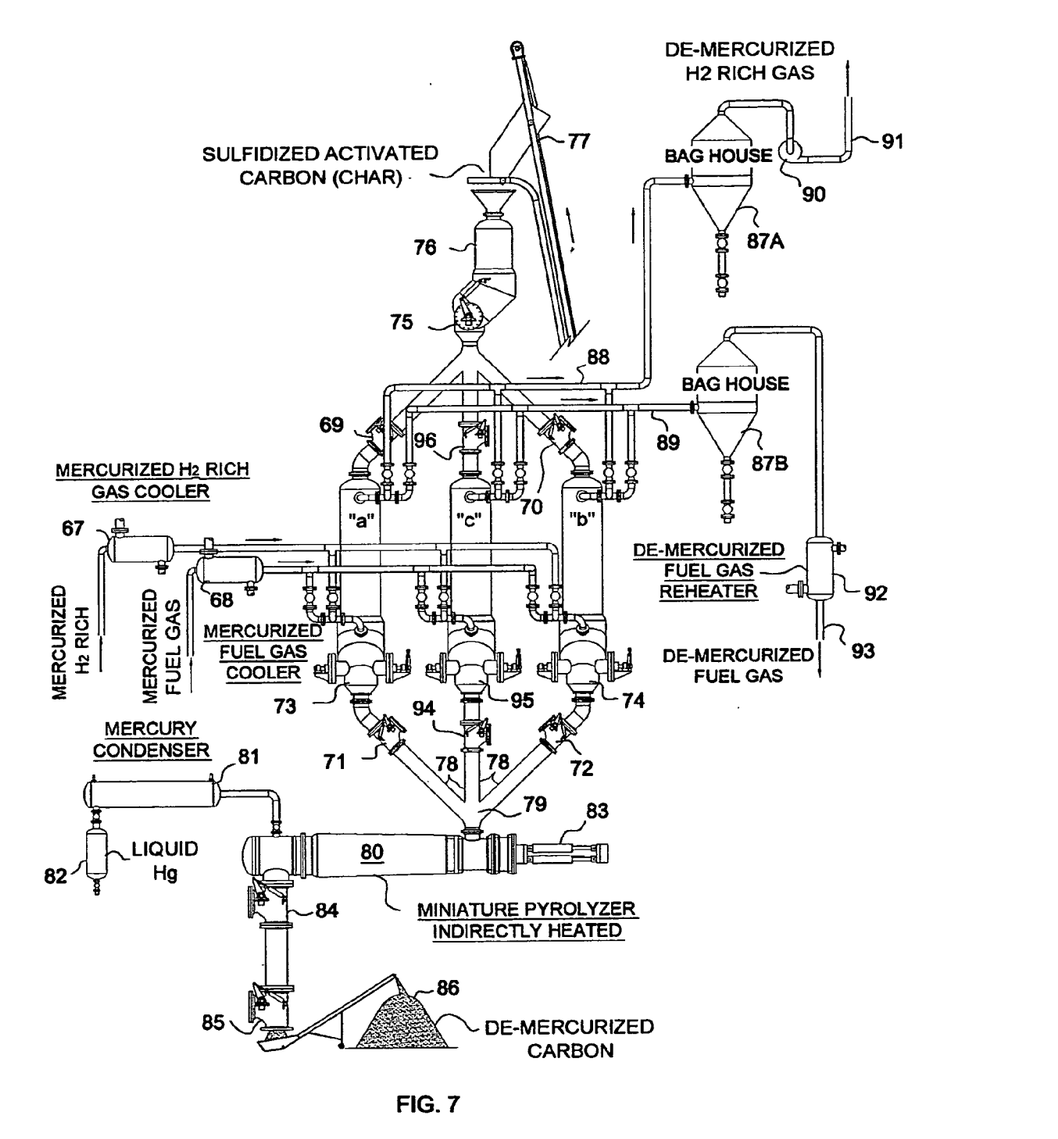
FIG. 7 illustrates the recovery of mercury (Hg) from the $H_2$ rich gas and from the fuel gas; these two gases being shown photographically by Fact Sheet 4.

FIG. 7 illustrates the preferred way of trapping mercury and recovering the mercury as elemental mercury, a very valuable product. This Figure consists of activated carbon beds "a," "b," and "c." By way of example, bed "a" would de-mercurize the $H_2$ rich gas, and bed "b" would de-mercurize the fuel gas. Prior to the gases being de-mercurized, the $H_2$ rich gas is passed through cooler 67, and the fuel gas is passed through cooler 68 to drop the temperature of the gases to render the de-mercurization of the gases effective, as de-mercurization takes place at low temperature, with the $H_2$ rich gas fed to bed "a" and the fuel gas to bed "b"; bed "c" is provided in the configuration to serve as an alternate bed for back-up when bed "a" or bed "b" requires maintenance; at that time, bed "c" is put into service.

Beds "a" and "b" get charged from the top with activated carbon, with flow control valves 69 and 70, respectively; beds "a" and "b" get discharged from the bottom, with flow control valves 71 and 72, respectively. Upstream of valves 71 and 72, feeders 73 and 74 are situated in such a way that feeder 73 is upstream of valve 71, and feeder 74 is upstream of valve 72. Upstream of flow control valves 69 and 70, common feeder 75 is disposed to enable the feed of fresh activated carbon to either bed "a" or bed "b," with common feeder 75 forming the lower portion of surge hopper 76, which serves as storage for fresh activated carbon; surge hopper 76 receives activated carbon by means of skip hoist 77, which elevates the activated carbon from ground level.

To regenerate the saturated (mercurized) carbon from beds "a" and "b," valves 71 and 72 discharge the mercurized carbon into the charging chamber of miniature heating pyrolyzer 80 by way of manifold 78 via common throat 79, within which the mercurized carbon is heated indirectly, causing the vaporization of the mercury which is directed from pyrolyzer 80 to condenser 81 where the recovered mercury is cooled and collected in liquid form in tank 82. The feed of the mercurized carbon through pyrolyzer 80 is effected by a ram pusher marked by numeral 83, and the de-mercurized carbon is discharged from pyrolyzer 80 by means of a lockhopper having an upper valve marked by numeral 84 and a lower valve marked by numeral 85, while the de-mercurized carbon is delivered by a stacking conveyor forming a storage pile marked by numeral 86.

Downstream of beds "a" and "b," two baghouses are disposed and respectively marked by numerals 87A and 87B, with baghouse 87A serving to clean particulate matter entrained in de-mercurized $H_2$ rich gas stream 88, and baghouse 87B serving to clean particulate matter entrained in de-mercurized fuel gas stream 89. Subsequent to the removal of particulate matter from stream 88, the cleaned, de-mercurized $H_2$ rich gas is raised in pressure from the preferred operating system pressure of about 300 psi to 750 psi by means of compressor 90, forming stream 91 which is directed to plant 24 (shown in FIG. 3) to produce a biofuel such as methanol that can be converted to gasoline or dimethyl ether; subsequent to the removal of particulate matter from stream 89, the cleaned, de-mercurized fuel gas is raised in temperature in heater 92, forming stream 93 which is directed to combustion turbine 94 to generate biopower in plant 25, both shown in FIG. 3. As stated above, activated carbon bed "c" can take the place of activated carbon bed "a" or activated carbon bed "b," as its purpose serves to substitute bed "a" or bed "b" when either one of these beds is down for maintenance by using valve 94 together with feeder 95 while isolating either bed "a" or bed "b" and making use of feeder valve 96 at the top of bed "c."

Figure 8:
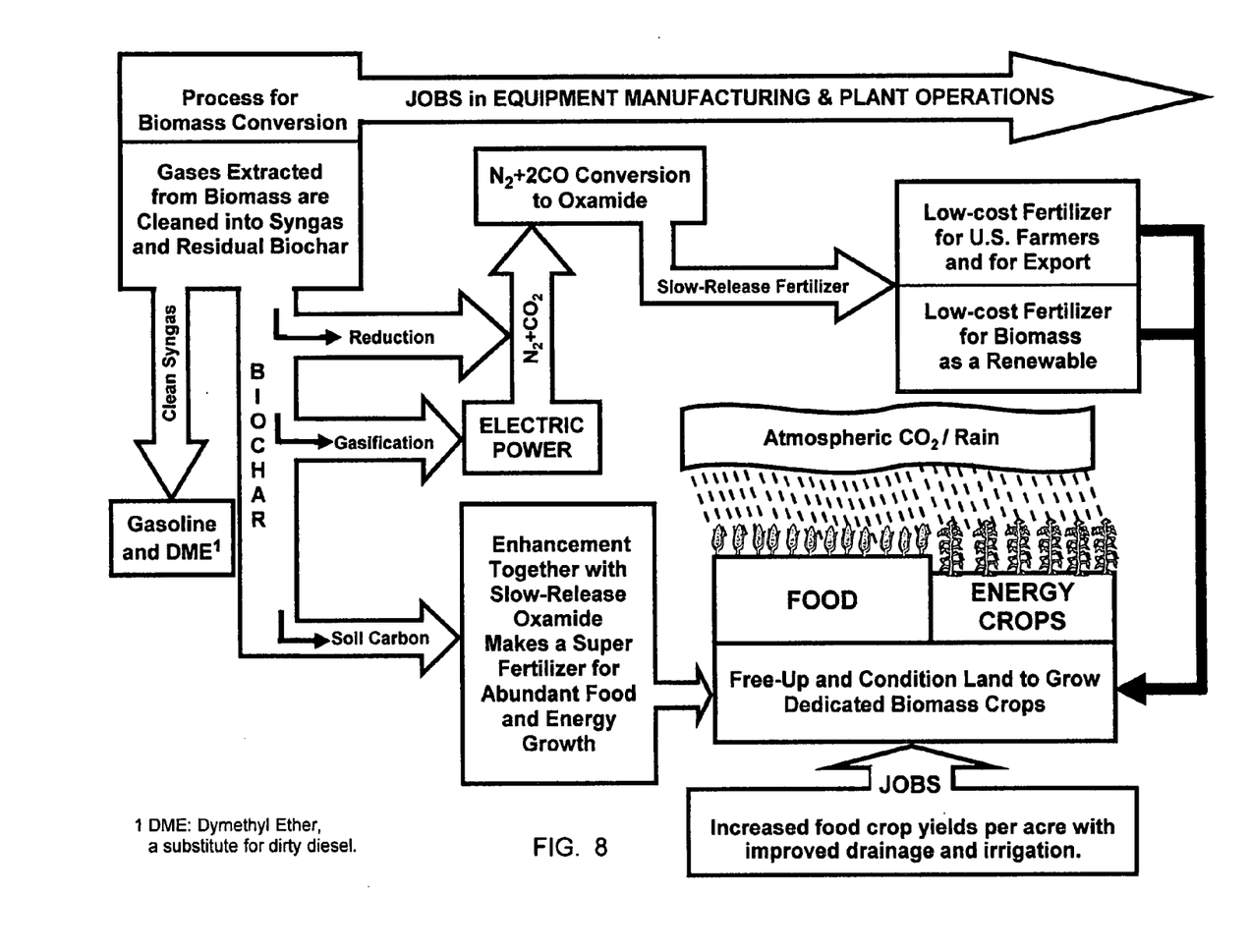
FIG. 8 is a diagram that illustrates a flow pattern that can be beneficial for the economy to grow food, as well as produce energy in the form of biofuels and biopower in a sustained manner in the form of gasoline (or dimethyl ether), electric power, and slow-release fertilizer called "Oxamide," whose properties are shown in Fact Sheet 5, which can be a most valuable by-product as a substitute for urea while putting $CO_2$ into good use.

The United States is blessed by a piece of real estate between two oceans with a temperate climate that is most suitable for the growth of abundant food not only for domestic consumption but also for export while still producing non-petroleum, clean transport fuels like gasoline and clean dimethyl ether to replace dirty diesel; clean, efficient electric power; and slow-release fertilizer such as oxamide from biomass without affecting the food supply, illustrated by the flow diagram described in FIG. 8, while co-producing a multitude of permanent, badly needed jobs.

In conclusion, the method and apparatus herein disclosed offer an efficient and novel approach to increase yield abundantly which insures sustainability in both sectors of agriculture as well as energy. It is to be understood that the details of construction disclosed herein are for the purpose of description and not limitation, since other configurations are possible without departing from the spirit of the invention.

We therefore claim the following:

1. In a method to sustain the combined yield of crops, together with biomass on farmland which uses a combination of sequential drainage and irrigation, the improvement comprising the following:

providing a retention storage to serve said farmland of a specific acreage, into which excess water from said farmland is collected and drained into said retention storage with the dual objective of: (a) the prevention of flooding of the crops growing on said farmland, and (b) the prevention of directing said excess water as a polluting run-off into waterways;

recovering water from said retention storage and irrigating said farmland to satisfy the moisture needs of said crops during dry weather;

increasing the yield of said crops by means of controlled sequential drainage into said retention storage and irrigation from said retention storage to cause the production of the same amount of crops produced prior to said sequential drainage into said retention storage and irrigation from said retention storage on less acreage than said specific acreage to result in vacating some acreage of said farmland;

dedicating the vacated acreage for the planting and growth of biomass as a feedstock for the production of energy in the form of biofuels and biopower without penalizing the yield of crops from said farmland;

producing environmental benefits from said sequential drainage into said retention storage and irrigation from said retention storage by preventing harmful effects being imparted to said waterways;

harvesting said biomass and compacting it to increase its bulk density for efficient delivery of said biomass in the form of a compacted feedstock;

collecting said compacted feedstock and delivering it to a central processing facility for conversion into a useful bio-product by means of a processor;

providing a pyrolyzer in said processor which is closed to the atmosphere that operates at pressure to increase efficiency;

force feeding said feedstock into said pyrolyzer;

heating said feedstock within said pyrolyzer to cause the devolatilization of said feedstock to co-produce a biomass-derived synthetic gas hereinafter referred to as a (bio-sygnas) and a biomass-derived char hereinafter referred to as a (bio-char);

converting said bio-syngas into a useful bio-product; and converting said bio-char into a different bio-product than that produced from said bio-syngas.

2. The method as set forth in claim 1 wherein said retention storage comprises a pond to collect and dispense water.

3. The method as set forth in claim 2 wherein said pond collects excess water from various parcels of farmland to prevent flooding of said parcels and delivers water to said various parcels of farmland to satisfy the need of plants being grown on said various parcels.

4. The method as set forth in claim 2 wherein said pond is adapted to collect discharges from other sources in addition to excess water from said farmland.

5. The method as set forth in claim 1 wherein said retention storage comprises a well configuration.

6. The method as set forth in claim 1 wherein said bio-product derived from said bio-syngas comprises a chemical.

7. The method as set forth in claim 6 wherein said chemical consists of being methanol formed from the bio-syngas having a ratio of $H_2$ to CO of 2.

8. The method as set forth in claim 7 wherein said methanol is converted to a bio-fuel.

9. The method as set forth in claim 8 wherein said bio-fuel comprises a transport fuel.

10. The method as set forth in claim 9 wherein said transport fuel comprises a non-petroleum derived gasoline.

11. The method as set forth in claim 9 wherein said transport fuel comprises a bio-fuel that constitutes a replacement for diesel fuel.

12. The method as set forth in claim 11 wherein said replacement for diesel fuel comprises dimethyl ether.

13. The method as set forth in claim 1 wherein said bio-char is gasified, producing a gas.

14. The method as set forth in claim 13 wherein said gas is a low-Btu gas, a "lean gas".

15. The method as set forth in claim 14 wherein said lean gas is used to generate electric power also referred to as "biopower".

16. The method as set forth in claim 14 wherein said lean gas is cleaned prior to being used.

17. The method as set forth in claim 1 wherein said bio-syngas is cleaned prior to being used.

18. The method as set forth in claim 1 wherein said bio-char is used to enhance soil to increase plant yield.

19. The method as set forth in claim 1 wherein said bio-char when being hot is used to convert $CO_2$ into 2CO.

20. The method as set forth in claim 19 comprises the use of 2CO which is utilized as a component of the feedstock to make fertilizer.

21. The method as set forth in claim 20 wherein said fertilizer contains bio-char for soil enrichment to increase plant yield.

* * * * *